United States Patent [19]

Hirota et al.

[11] Patent Number: 4,629,489
[45] Date of Patent: Dec. 16, 1986

[54] METHOD OF MANUFACTURING PRESSED LENSES

[75] Inventors: Shinichiro Hirota; Tetsuro Izumitani, both of Tokyo, Japan

[73] Assignee: Hoya Corporation, Tokyo, Japan

[21] Appl. No.: 753,050

[22] Filed: Jul. 9, 1985

[30] Foreign Application Priority Data

Jul. 9, 1984 [JP] Japan .................. 59-140548
Aug. 16, 1984 [JP] Japan .................. 59-170019

[51] Int. Cl.⁴ .......................................... C03B 23/00
[52] U.S. Cl. ................................... 65/102; 65/76; 65/83; 65/104
[58] Field of Search ............... 65/76, 83, 102, 29, 65/104, 160, 162, 163

[56] References Cited

U.S. PATENT DOCUMENTS

| | | |
|---|---|---|
| 3,833,347 | 9/1974 | Angle et al. |
| 3,900,328 | 8/1975 | Parsons et al. ............ 65/76 X |
| 4,139,677 | 2/1979 | Blair et al. |
| 4,168,961 | 9/1979 | Blair . |
| 4,398,935 | 8/1983 | Smulders et al. .......... 65/102 X |
| 4,481,023 | 11/1984 | Marechal et al. .......... 65/104 X |

FOREIGN PATENT DOCUMENTS

56-378 of 1981 Japan .
58-8134 of 1983 Japan .

Primary Examiner—Arthur Kellogg
Attorney, Agent, or Firm—Cushman, Darby & Cushman

[57] ABSTRACT

A method of manufacturing a pressed lens based upon the discovery that a high quality lens may be molded despite the fact that the lens is cooled without pressure being applied to the mold. A lens preform is inserted into the pressing mold and pressure is applied to the mold while the preform and mold are at a temperature corresponding to a viscosity of the preform of $10^{8.5} - 10^{10.5}$ poise. The pressure is then removed while the resulting molding remains in contact with the mold and the preform and mold are then cooled. When the temperature of the preform has fallen to a value corresponding to a viscosity of the molding of not smaller than $10^{11.5}$, the molding may be removed from the pressing mold. The preform may be inserted into the mold and then the preform and the mold may be heated prior to pressing, or alternately, the preform and the mold may be heated separately and the preform may be transferred into the mold for pressing. In the latter case, the preform is held by a holder which remains in the mold during pressing. To increase the lens production rate, the lens and the mold may be cooled at a location different from the location at which pressing occurred.

23 Claims, 3 Drawing Figures

METHOD OF MANUFACTURING PRESSED LENSES

BACKGROUND OF THE INVENTION

1. Field of the Invention

The present invention relates to methods of manufacturing lenses using pressing molds.

2. Description of the Prior Art

Recently, attempts have been made to mold lenses having an optical mirror surface without grinding and polishing. These attempts have used a mold made of a specific material and formed to have an optical mirror surface. The molding has been performed in a non-oxidizing atmosphere. As the material for the mold, for example, the use of glassy carbon is disclosed in U.S. Pat. No. 3,833,347, the use of SiC or $Si_3N_4$ is disclosed in U.S. Pat. No. 4,139,677, and the use of a mixture of SiC and carbon is disclosed in U.S. Pat. No. 4,168,961.

In the molding method disclosed in U.S. Pat. No. 3,833,347, or the like, a block of glass is inserted into a mold. Then the inside of a chamber surrounding the mold is evacuated and non-oxidizing gasses are introduced into the chamber. The temperature of the mold is then raised to a value in the vicinity of the glass softening point (that is, a temperature corresponding to a glass viscosity of $10^{7.65}$ poise) and is maintained for 1 to 5 minutes. The glass is then molded by applying a force to the mold. The temperature of the mold is then reduced to a value lower than the glass transition temperature while the force on the mold is maintained so that the molded glass does not deform. Then, the force is removed and the mold is cooled to about 300° C. in order to prevent oxidation of the mold. Finally, the mold is opened and the molded lens is taken out. A problem exists, however, in that the steps of this process must be performed sequentially, resulting in a long cycle time.

Japanese Patent Application Laid-Open No. 8134/1983 discloses a method of molding glass products in which a wide range of mold materials can be employed and the time taken for a pressing cycle is shorter. In this method, a glass preform having a shape approximate to that of the final product is used and after the glass preform and a mold are heated to a temperature producing a glass viscosity not smaller than $10^8$ poise but not larger than $10^{12}$ poise, a force is applied to mold the glass preform. The SHAPED GLASS is then REMOVED from the mold at a temperature where glass exhibits a viscosity of less than $10^{13}$ poise, and then the shaped glass is annealed.

However, in both of these methods of molding glass products, cooling is performed with a force applied to the mold. Accordingly, the time required for the pressing step has been long and overall manufacturing speed has improved little.

When it is desired to obtain a high surface accuracy, it is important to prevent shrinkage. Japanese Patent Publication No. 378/1981 teaches pressing molten glass with a mold maintained at a predetermined temperature between the softening point and the transition point for 20 seconds or more to prevent shrinkage. However, this method does not completely prevent shrinkage from occurring because the glass is taken out without reducing the pressure after pressure at a relatively early stage.

SUMMARY OF THE INVENTION

The present invention overcomes these problems by cooling the molded lens in a pressing mold but without pressure being applied. Since the lens remains in the mold, no temperature difference is generated between the glass surface and the interior of the molded lens and shrinkage is prevented so that a pressed lens having a high surface accuracy can be obtained.

According to the present invention, a glass preform is inserted into a pressing mold in which an upper and lower mold are within a sleeve and at least the upper mold is made slidable. A force is then applied to the upper mold to press the glass preform by using a pressing rod arranged separately from the upper mold at a temperature corresponding to a glass viscosity between $10^{8.5}$ and $10^{10.5}$ poise for a time from several seconds to several tens of seconds. The force is then removed from the pressing rod and the thus obtained glass lens is cooled in the mold until the glass viscosity reaches a value not smaller than $10^{11.5}$ poise. In fact, the pressing rod may be withdrawn from the molds.

Thus, the present invention results from the discovery that high surface accuracy may be obtained even though the cooling step is not performed under pressure as long as pressing is initiated at a relatively high glass viscosity of $10^{8.5} - 10^{10.5}$ poise and the entire glass body is uniformly cool by leaving the glass in the pressing mold.

In the prior art as described above, a pressing rod for applying a force to the mold is coupled, for example, with an upper mold, when the force is removed, and thereafter a temperature differential develops between upper and lower surfaces of the glass because the glass is in the lower mold. Accordingly, if mold portions are separated at a glass viscosity of $10^{8.5} - 10^{10.5}$ poise, high surface accuracy could not be obtained because shrinkage or the like might occur. Therefore it has been necessary to continue pressing until the viscosity increases to a value not smaller than $10^{11.5}$ poise at which the glass was completely solidified.

According to the present invention, the respective steps of heating, pressing, gradually cooling, and rapidly cooling may be performed in separate chambers. Further, the cooling step in the upper and lower molds before the glass viscosity has reached a value not smaller than $10^{11.5}$ poise may be separated to be performed in a plurality of chambers or may be performed in a temperature-gradient furnace, so that the cooling step can be performed continuously by using a number of pressing molds to thereby remarkably improve the manufacturing speed as a whole.

Further, according to the present invention, a preform and the mold may be separately heated to temperatures corresponding to glass viscosities of $10^{8.5}$ and $10^{10.5}$ poise respectively. Then the upper mold may be slightly lifted to insert the glass preform through a hold formed in the side wall of the sleeve to allow pressing. In this case, the glass may be heated and transferred by using a holder. The holder is inserted into the pressing mold together with the glass and pressure is applied with a pressing rod. The pressing rod is then removed and the glass is cooled until the glass viscosity reaches a value not smaller than $10^{11.5}$ poise with the glass enclosed by the holder and the pressing mold, and the molded glass lens is taken with the holder.

BRIEF DESCRIPTION OF THE DRAWINGS

These and other objects and advantages of this invention will become more apparent and more readily appreciated from the following detailed description of the presently preferred exemplary embodiments of this invention, taken in conjunction with the accompanying drawings, of which.

DETAILED DESCRIPTION OF THE PRESENTLY PREFERRED EXEMPLARY EMBODIMENTS

Figure 1:
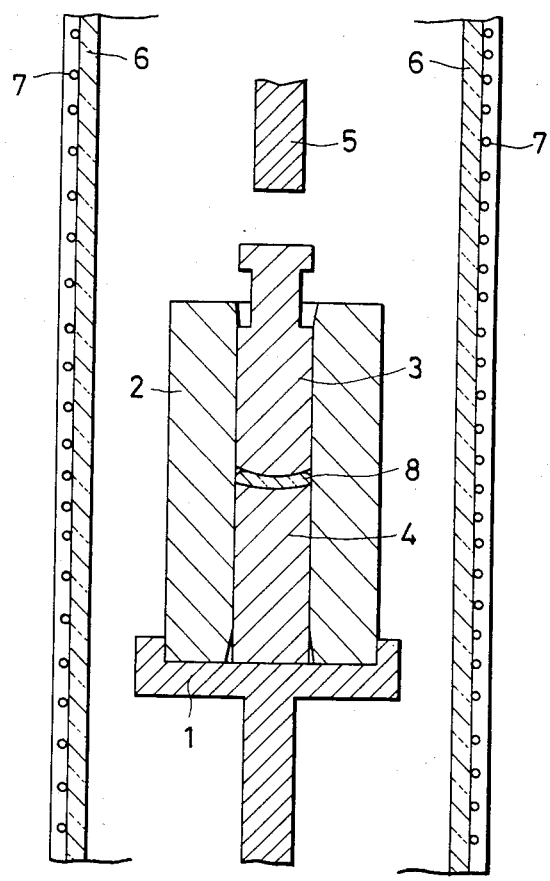
FIG. 1 is a partly elliptical longitudinal sectional view of apparatus which may be employed with a first embodiment of this invention.

FIG. 1 schematically shows the arrangement of apparatus which may be used in a first embodiment of this invention. A sleeve 2 is disposed on a support 1. An upper mold 3 and a lower mold 4 are slidably mounted in sleeve 2 so as to constitute a pressing mold. A pressing rod 5 is arranged separately from upper mold 3 but may be moved to apply a force to upper mold 3. The mold is enclosed in a silica tube 6 and is heated by heater 7.

To mold a lens in accordance with the present invention a glass preform 8 is enclosed between upper mold 3 and a lower mold 4 in sleeve 2. After a non-oxidizing atmosphere has been introduced in tube 6, pressing rod 5 is driven to apply a pressure of 30-500 kg/cm$^2$ to molds 3 and 4 at a predetermined temperature corresponding to a glass viscosity of $10^{8.5}-10^{10.5}$ poise for several seconds to several tens of seconds. Then, only pressing rod 5 is withdrawn while leaving upper mold 3 on the glass molding, releasing pressure from the glass other than the weight of upper mold 3 itself. Alternatively, pressing rod 5 may remain resting on mold 3 but with no pressure being applied. The glass molding is then cooled at a rate not faster than 1.5° C./sec with the glass molding enclosed between molds 3 and 4. Then, when the temperature reaches a value corresponding to a glass viscosity not smaller than $10^{11.5}$ poise molds 3 and 4 are separated so that the lens may be taken out, whereby a pressed lens having high space accuracy and fine surface finish can be obtained.

Glass preform 8 may have been formed by pressing material into a shape similar to that of the final product, diamond-grinding the material into an external form similar to a final product and then grinding and polishing or irradiating the material with a $CO_2$ laser beam so as to smooth the outer surface thereof, etc.

Although any kind of glass may be used according to the present invention, the kind of glass is determined depending on its viscosity in view of molding conditions. An allowable maximum value of the cooling speed to cause the glass viscosity to reach a value not smaller than $10^{11.5}$ poise after pressing is performed, varies depending on the size, thickness, and shape of a lens. Further, the allowable maximum speed varies also depending on the degree of surface accuracy to be obtained. Accordingly, the allowable maximum speed cannot be defined unconditionally. The goal is to prevent a temperature differential between the surface and inside of the glass during cooling.

Any material may be used for molds 3 and 4 which can be processed to have an optical mirror surface, which can withstand high temperatures, which will not fuse with the glass when it has a viscosity of $10^{8.5}$ poise, and which will not cause chapping in the glass surface. However, generally it is difficult to find a material that does not cause chapping in the glass surface due to oxidation by air. Therefore, it may be desirable to operate the mold in a non-oxidizing atmosphere.

A more specific example of this embodiment will now be provided. Tungsten carbide was used as a material for molds 3 and 4. A high refraction flint system optical glass SF11 (the transition temperature: 434° C.) was used as preform 8. The final lens had a spherical meniscus shape having an external diameter of 7 mm. Glass preform 8 was diamond-ground by using a curve generator to have a shape similar to the final product, and irradiated with a $CO_2$ laser beam so as to smooth the surface substantially without deforming. Glass preform 8 was set between upper and lower molds 3 and 4, and silica tube 6 was filled with $N_2$ gas after evacuation. Then, glass preform 8 was heated together with the pressing mold.

When the temperature was stabilized at 490° C., corresponding to a glass viscosity of $10^9$ poise, rod 5 was driven to apply a pressure of 100 kg/cm$^2$ for ten minutes to upper mold 3. The pressure was then removed by separating pressing rod 5 from mold 3 and the glass was cooled at a rate of 25° C./min with the glass enclosed between upper and lower molds 3 and 4 in sleeve 2. When the temperature fell to 448° C., corresponding to a glass viscosity of $10^{11.7}$ poise, support 1 was moved to a taking out position so that the molded lens was removed. The surface accuracy obtained after annealing was one or less Newton ring and one fifth or less astigmatism.

Figure 2:
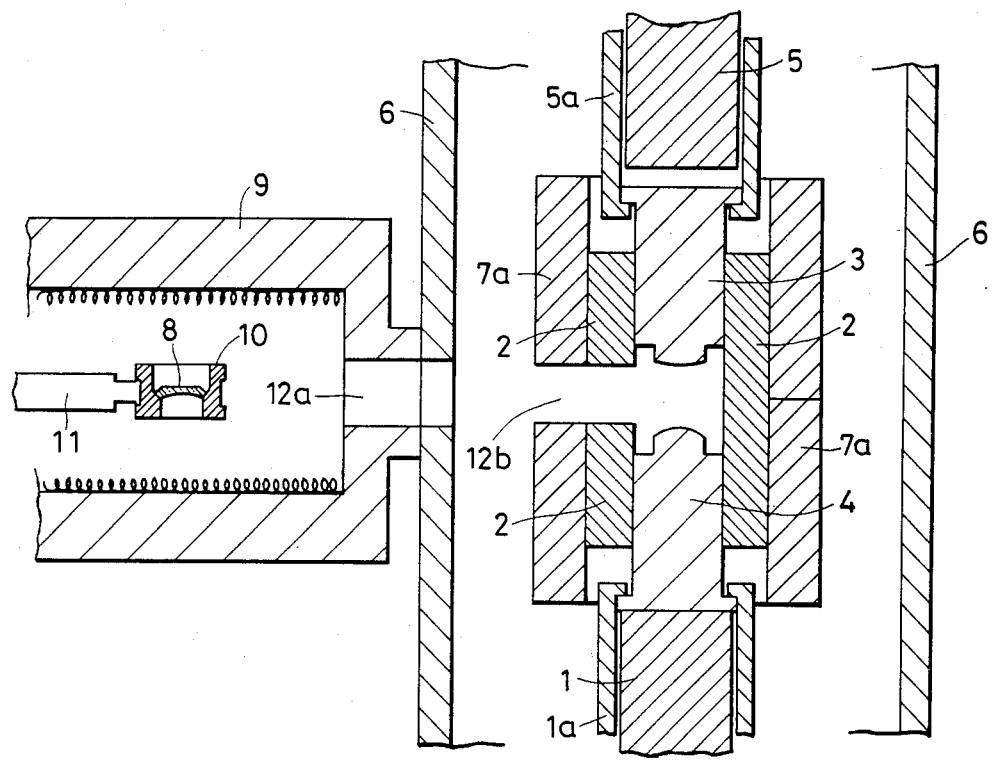
FIG. 2 is a partly elliptical longitudinal sectional view showing an example of apparatus which may be employed with a second embodiment of this invention.

FIG. 2 shows apparatus which may be used in a second embodiment of this invention. In FIGURE 2, members or portions the same as or equivalent to those in FIG. 1 are referenced with the same numeral and repeated description is omitted. In this apparatus, a furnace 9 for heating a glass preform 8 is provided separately from a pressing portion. Glass preform 8 is held by holder 8 and holder 8 is moved between furnace 9 and the pressing mold in tube 6 by transfer device 11. A transfer hole 12a is formed in the side wall of furnace 9 and tube 6 to allow holder 10 to pass within tube 6. Heater 7a is provided for heating the pressing mold and an insert hole 12b is bored through heater 7a and sleeve 2 at a position corresponding to the position of transfer hole 12a. Associated with pressing rod 5 is support 5a which both guides pressing rod 5 and cooperates with upper mold 3 to lift upper mold 3 when desired. Similarly, supporter 1a is associated with support 1 and cooperates with lower mold 4 to move lower mold 4 when desired.

To mold the lens in accordance with this embodiment, glass preform 8 is placed in holder 10. After a non-oxidizing atmosphere has been introduced in furnace 9 after exhausting, furnace 9 is heated to a predetermined temperature corresponding to a glass viscosity of $10^{8.5}-10^{10.5}$ poise. After preform 8 has attained the appropriate temperature and corresponding viscosity, transfer device 11 moves holder 10 from furnace 9 through transfer hole 12a and insert hole 12b so that holder 10 with preform 8 is positioned between upper mold 3 and lower mold 4. Then, support rod 1 with supporter 1a moves mold portion 4 to contact holder 10 and preform 8. At the same time, supporter 5a allows upper mold 3 to drop into contact with holder 10 and preform 8. At this time, since upper mold 3 and supporter 5a are not rigidly attached to each other, only the weight of upper mold 3 itself is applied to glass preform 8. At the same time, heater 7a heats molds 3 and 4 to a temperature corresponding to a glass viscosity of $10^{8.5}-10^{10.5}$ poise.

Glass preform 8 is then pressed by pressing rod 5 with the pressure of 30–500 kg/cm$^2$. The pressing continues for several seconds to several tens seconds. Then, only pressing rod 5 is lifted so that only the weight of upper mold 3 itself is applied to preform 8. In this condition, preform 8 is allowed to cool at a rate no greater than 1.5° C./sec. with the glass molding enclosed between molds 3 and 4. Once the molding temperature falls to a value corresponding to a glass viscosity of not smaller than $10^{11.5}$, supporter 5a raises upper mold 3 and support rod 1 and supporter 1a allow lower mold 4 to drop so that transfer device 11 may remove holder 10 and the lens from the furnace.

A more concrete example in accordance with the second embodiment of this invention demonstrated in FIG. 2 will now be provided. The material for molds 3 and 4 and the kind of glass were similar to those in the detailed example described above with respect to FIG. 1. The final lens had a spherical biconcave shape having an outer diameter of 12 mm. Preform 8 was made in a pressing mold to have a shape similar to that of the final product. In advance, upper and lower molds 3 and 4 and sleeve 2 were heated by heater 7a and maintained at 478° C. corresponding to a glass viscosity of $10^{9.5}$ while causing N$_2$ gas to flow about the neighborhood of the mold. Holder 10, carrying glass preform 8, was held by transfer device 11 and heated in furnace 9 until the viscosity of preform 8 reached $10^{9.5}$ poise. Then, glass holder 10 was moved by transfer device 11 into sleeve 2 through transfer hold 12a and insert hole 12b. Lower mold 4 was lifted while upper mold 3 was lowered by lowering supporter 5a, so that glass preform 8 was enclosed by upper and lower molds 3 and 4 and holder 10. Since upper mold 3 and supporter 5a are not rigidly connected, only the weight of upper mold 3 itself as applied to glass preform 3. After a few seconds, glass preform 8 was pressed at a pressure of 250 kg/cm$^2$ for ten seconds by lowering pressing rod 5. Then, pressing rod 5 was lifted and all forces, other than the weight of upper mold 3 itself, was removed and glass preform 8 was cooled at a rate of 15° C./min. When the temperature fell to 448° C., corresponding to the glass viscosity of $10^{11.7}$ poise, upper mold 3 was slightly lifted by supporter 5a while lower mold 4 was slightly lowered and holder 10 and glass preform 8 were taken out by transfer device 11. The surface accuracy after annealing was two or less Newton rings and one-half or less astigmatism.

Figure 3:
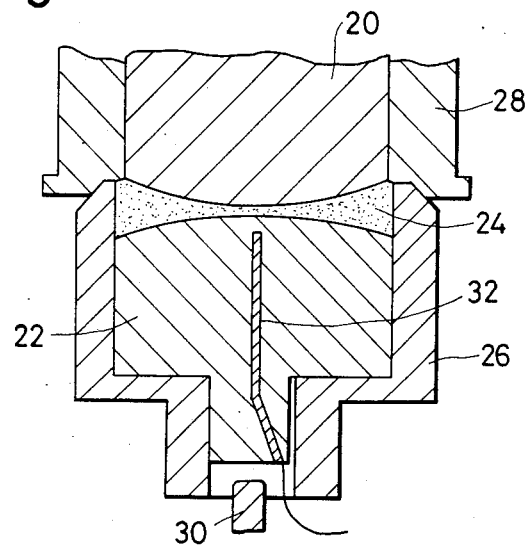
FIG. 3 is a sectional view of apparatus which may be employed with a third embodiment of this invention.

Yet another alternative arrangement is illustrated in FIG. 3. According to FIG. 3, upper mold 20 and lower mold 22 may be disposed to provide a space in which glass 24 is inserted. Lower mold 22 is held by support 26 while upper mold 20 slides within sleeve 28. To align upper and lower molds 20 and 22, respectively, support 26 is provided with a surface which cooperates with sleeve 28. Pressing rod 30 is disposed to press against lower mold 22. Thermocouple 32 may be provided in lower mold 22 to sense the temperature of the mold.

In a more detailed example, a high refraction flint system optical glass SF11 (transition point: 434° C.) was set between molds 20 and 22 and glass 24 was heated together with molds 20 and 22 in an atmosphere of N$_2$ gas. When the temperature of the metal mold and glass, as sensed by thermocouple 32, was stabilized at 485° C. corresponding to a glass viscosity of $10^{9.2}$ poise, centering was performed by sleeve 28 contacting support 26 and then pressure was initiated by pressing rod 30 at a pressure of 100 kg/cm$^2$. After ten seconds, the pressure was released to about 5 kg/cm$^2$, and at the same time cooling was performed at a cooling rate of 0.5° C./sec. When the viscosity at the center portion of the glass reached $10^{12}$ poise (445° C.), upper mold 20 was lifted so as to take out the formed lens. Examination after annealing proved that the thus obtained biconcave lens had a surface accuracy of one or less Newton rings and 1/5 or less astigmatism, and had a diameter of 10 mm, a central thickness of 1 mm, R$_1$=25 mm and R$_2$=50 mm.

In another more detailed example, the final biconcave lens was shaped to have a diameter of 20 mm, a central thickness of 2 mm, R$_1$=25 mm and R$_2$=50 mm, the kind of glass being similar to that of the previous example. The glass and mold were heated to 478° C. corresponding to a glass viscosity of $10^{9.5}$ poise, and pressing was initiated with a pressure of 250 kg/cm$^2$. After 25 seconds, the pressure was reduced to 10 kg/cm$^2$, and, at the same time, cooling was performed at a cooling rate of 0.25° C./sec. Pressing was ended at 448° C. corresponding to a glass viscosity of $10^{11.7}$ poise and the formed lens was taken out. Measurements after annealing showed that the lens having a surface accuracy of two or less Newton rings and ½ or less astigmatism could be stable obtained.

With respect to the embodiments of this invention demonstrated in FIGS. 1 and 2, gradual cooling was described as being performed at the place where press-molding was performed for simplicity. However, since the present inventors have discovered that it is not necessary to maintain pressure on the molded lens during gradual cooling, a number of assemblies including molds 3 and 4 and sleeve 2 may be simultaneously employed so that after press-molding occurs at the location associated with pressing rod 5, the mold assembly together with the molded lens may be moved elsewhere for gradual cooling. As a result, since pressing is performed substantially continuously, without waiting for gradual cooling, the number of lenses molded with this system can be increased remarkably. Thus, some or all of the steps of heating, pressing, gradual cooling and rapid cooling may be performed in separate chambers. Similarly, the gradual cooling step may be performed as the mold assembly passes through a temperature-gradient furnace.

Although only several embodiments of this invention have been described in detail above, those skilled in the art will realize that many modifications are possible in the preferred embodiments without materially departing from the novel teachings and advantages of this invention. For example, although heaters in the embodiments described above are all of resistive type, those skilled in the art will readily appreciate that rapid heating may be performed by using a high-frequency induction heating system.

Accordingly, all such modifications are intended to be included within the scope of this invention as defined by the following claims.

What is claimed is:

1. A method of manufacturing a pressed lens, comprising the steps of:
    inserting a preform into a pressing mold having a first mold and a second mold disposed within a sleeve, at least one of said first and second molds being slidable within said sleeve;

pressing said first and second molds together while said preform is at a temperature corresponding to a preform viscosity of $10^{8.5}-10^{10.5}$ poise, said pressing being performed by a pressing rod pressing against said first and second molds, said pressing rod being separable from said first and second molds;

withdrawing pressure applied in said pressing step while maintaining a resulting molding within said pressing mold in contact with said first mold and said second mold by separating said pressing rod from said first and second molds;

cooling said molding while said molding contacts said first mold and said second mold; and removing said molding from said first mold and said second mold after said molding reaches a temperature having a corresponding viscosity not smaller than $10^{11.5}$ poise.

2. A method as in claim 1 wherein said pressing step includes the step of applying a pressure of 30 to 500 kg/cm$^2$ to said first and second molds.

3. A method as in claim 1 further comprising the step of grinding material into the general shape of a desired lens to form said preform.

4. A method as in claim 3 further comprising the step of further grinding said preform to smooth its surface.

5. A method as in claim 3 further comprising the step of irradiating said preform after said grinding step with a laser to smooth the surface of said preform.

6. A method as in claim 1 further comprising the step of press-molding material in the general shape of a desired lens to form said preform.

7. A method as in claim 1 wherein said cooling step cools said molding at a rate sufficiently slow to prevent the creation of a temperature differential between a surface of said molding and the inside of said molding.

8. A method as in claim 7 wherein said cooling step cools said molding at a rate no faster than 1.5° C./sec.

9. A method as in claim 1 wherein said pressing step is performed in a non-oxidizing atmosphere.

10. A method as in claim 1 further comprising the step of moving at least said first and second molds with said molding after said withdrawing step so that said cooling step is performed at a location different from the location at which said pressing step occurred.

11. A method of manufacturing a pressed lens comprising the steps of:

inserting a preform into a pressing mold having a first mold and a second mold disposed within a sleeve, at least one of said first and second molds being slidable within said sleeve;

heating said preform and said first and second molds to a temperature corresponding to a viscosity of said preform of $10^{8.5}-10^{10.5}$ poise;

pressing said first and second molds together after said heating step with a pressing rod which is separable from said first and second molds;

withdrawing pressure applied in said pressing step while maintaining a molding resulting from said pressing step in contact with said first and second molds by separating said pressing rod from said first and second molds;

cooling said molding while said molding is in contact with said first and second molds; and removing said molding from said first and second molds when the temperature of said molding falls to a value corresponding to a viscosity of said molding of not smaller than $10^{11.5}$ poise.

12. A method as in claim 11 wherein said pressing step applies 30 to 500 kg/cm$^2$ pressure to said first and second molds.

13. A method as in claim 11 wherein said cooling step is performed at a rate sufficiently slow to prevent a temperature differential from forming between a surface of said molding and the inside of said molding.

14. A method as in claim 13 wherein said molding is cooled at a rate no greater than 1.5° C./sec.

15. A method as in claim 11 wherein said pressing step occurs in a non-oxidizing atmosphere.

16. A method as in claim 11 further comprising the step of moving at least said first and second molds and said molding after said withdrawing step so that said cooling step occurs at a location different from the location at which said pressing step occurred.

17. A method of manufacturing a pressed lens comprising the steps of:

heating a preform to a temperature corresponding to a viscosity of said preform of $10^{8.5}-10^{10.5}$ poise;

heating a pressing mold having first and second molds disposed within a sleeve, at least one of said first and second molds being slidable within said sleeve, to a temperature corresponding to a viscosity of said preform of $10^{8.5}-10^{10.5}$ poise;

inserting said preform into said pressing mold after both said heating steps;

pressing said first and second molds together with a pressing rod which is separable from said first and second molds;

withdrawing pressure applied during said pressing step while maintaining a resulting molding in contact with said first and second molds by separating said pressing rod from said first and second molds;

cooling said molding while said molding remains in contact with said first and second molds; and removing said molding from said pressing mold after a temperature of said molding has fallen to a value corresponding to a viscosity of said molding not smaller than $10^{11.5}$ poise.

18. A method as in claim 17 wherein said pressing step includes the step of applying 30 to 500 kg/cm$^2$ pressure to said first and second molds.

19. A method as in claim 17 wherein said cooling step is performed at a sufficiently slow rate to prevent a temperature differential from developing between a surface of said molding and the interior of said molding.

20. A method as in claim 19 wherein said cooling rate is no greater than 1.5° C./sec.

21. A method as in claim 17 wherein said pressing step is performed in a non-oxidizing atmosphere.

22. A method as in claim 17 further comprising the step of moving said first and second molds and said molding after said withdrawing step so that said cooling step is performed at a location different from the location at which said pressing step is performed.

23. A method as in claim 17 wherein:

said method further comprises the step of inserting said preform in a holder prior to said preform heating step;

said preform heating step includes the step of heating both said holder and said preform to a temperature corresponding to a viscosity of said preform of $10^{8.5}-10^{10.5}$ poise;

said inserting step includes the step of transferring both said preform and said holder into said pressing mold; and said pressing step is performed with both said preform and said holder between said first and second molds.

* * * * *